United States Patent [19]

Neukam et al.

[11] 4,145,500

[45] Mar. 20, 1979

[54] STABILIZATION OF CROSSLINKABLE POLYMERS

[75] Inventors: Theo Neukam, Dormagen; Frank Druschke, Stuttgart; Francis Bentz, Cologne; Günther Nischk, Dormagen, all of Fed. Rep. of Germany

[73] Assignee: Bayer Aktiengesellschaft, Leverkusen, Fed. Rep. of Germany

[21] Appl. No.: 819,162

[22] Filed: Jul. 26, 1977

[30] Foreign Application Priority Data

Jul. 28, 1976 [DE] Fed. Rep. of Germany ....... 2633766

[51] Int. Cl.$^2$ .......................................... C08F 220/48
[52] U.S. Cl. ...................................... 526/204; 526/6; 526/220; 526/287; 526/304
[58] Field of Search ....................... 526/220, 204, 304

[56] References Cited

U.S. PATENT DOCUMENTS

| 3,262,985 | 7/1966 | Müller et al. ...................... 526/304 |
| 4,076,925 | 2/1978 | Neukam et al. ..................... 526/204 |

*Primary Examiner*—Harry Wong, Jr.
*Attorney, Agent, or Firm*—Plumley and Tyner

[57] ABSTRACT

The invention relates to a process for the production of a stabilized crosslinkable copolymer of acrylonitrile which comprises copolymerizing at least 65% by weight of acrylonitrile with from 0.1 to 3% by weight of an N-methylol acyl ester of an ethylenically unsaturated carboxylic acid amide, optionally from 0.5 to 5% by weight of an N-methylol alkyl ether of an ethylenically unsaturated carboxylic acid amide and, optionally, at least one other copolymerizable comonomer in an aqueous medium in the presence of a redox catalyst and in the presence of at least one water-soluble compound containing a carboxylic acid amide group.

1 Claim, No Drawings

STABILIZATION OF CROSSLINKABLE POLYMERS

This invention relates to a process for the production of stabilized crosslinkable polymers of acrylonitrile, a crosslinking component and, optionally, other comonomers with water-soluble amides and/or ureas and/or lactams. Acrylic or methacrylic acid amides substituted by methylol acyl ester groups are used as the crosslinking component.

It is already known (E. Muller et al, Makro. Mol. Chem. 57, 27 (1962)) that methylol acyl esters of acid amides readily crosslink in the presence of acids or acid donors.

It is also known that spontaneously crosslinkable polymers can be stabilized by the addition of an α-amino-carboxylic acid during or after polymerisation (German Offenlegungsschrift No. 19 11 360). Emulsions of homopolymers or copolymers of olefinically unsaturated amides containing methylol groups can be rendered storable by this process.

In the process described in French Pat. No. 1,500,101, crosslinking during polymerization is prevented by the addition of mineral salts. The addition of mineral salts also prevents crosslinking during drying.

Stabilizations such as these are necessary because undesirable crosslinking can occur very quickly during the actual polymerisation of acrylonitrile and N-methylol acyl esters of (meth)acrylic acid amides or of acrylonitrile, N-methylol acyl esters and N-methylol alkyl ethers of (meth)acrylic acid amides, especially when polymerization is carried out in an acidic medium, as is normally the case. Unfortunately, the use of conventional stabilizers involves disadvantages, for example the fact that, on completion of polymerization, the polymer obtained has to be treated with a very large quantity of washing agent in order to remove at least most of the salt added.

It has now been found that acrylonitrile can be smoothly polymerized in the absence of crosslinking with (meth)acryl-amide-N-methylol acyl esters and, optionally, alkyl ethers and, optionally, other comonomers, providing water-soluble amides and/or ureas and/or lactams are added to the reaction mixture before the polymerization reaction.

Accordingly, the present invention relates to a process for the production of a stabilized crosslinkable copolymer of acrylonitrile which comprises copolymerizing at least 65% by weight of acrylonitrile with from 0.1 to 3% by weight of an N-methylol acyl ester of an ethylenically unsaturated carboxylic acid amide, optionally from 0.5 to 5% by weight of an N-methylol alkyl ether of an ethylenically unsaturated carboxylic acid amide and, optionally, at least one other copolymerizable comonomer, in an aqueous medium in the presence of a redox catalyst, the polymerization being carried out in the presence of from 2 to 12% by weight, based on the total quantity of monomer, of at least one water-soluble compound containing a carboxylic acid amide group.

The water-soluble compound containing a carboxylic acid amide group used in accordance with the invention is preferably a carboxylic acid amide corresponding to the formula:

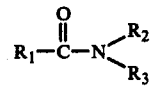

in which
R$_1$ represents hydrogen, an alkyl radical with up to 6 carbon atoms, an aromatic radical, preferably phenyl, or the group

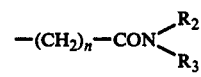

where n is an integer from 1 to 3, and
R$_2$ and R$_3$, which may be the same or different, represent hydrogen or an alkyl radical with 1 or 2 carbon atoms,
or a urea corresponding to the general formula:

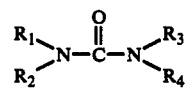

in which
R$_1$ to R$_4$, which may be the same or different, represent hydrogen or an alkyl radical with up to 3 carbon atoms,
or a lactam corresponding to the general formula:

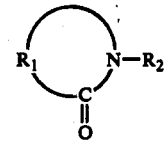

in which
R$_1$ is an alkylene radical with 3 to 6 carbon atoms, and
R$_2$ represents hydrogen or an alkyl radical with 1 to 3 carbon atoms.

In the context of the invention, the expression "water-soluble" does not mean that the carbonamide compound has to be miscible with water in any ratio. However, it should have a solubility in water under the polymerization conditions of from 2 to 12% and preferably from 5 to 9% by weight.

Examples of stabilizers, which are preferably used in quantities of from 5 to 9% by weight, are dimethyl formamide, acetamide, propionic acid amide, butyric acid amide, valeric acid amide, benzamide, malonic acid diamide, succinic acid diamide, glutaric acid diamide, urea, N-methyl urea, N-ethyl urea, N,N'-dipropyl urea, trimethyl urea, N-methyl pyrrolidone and caprolactam. It is preferred to use urea, N-methyl urea, acetamide and caprolactam. Urea and caprolactam are particularly preferred.

According to the invention, the (meth)acrylic acid amide-N-methylol acyl esters used are preferably compounds corresponding to the general formula:

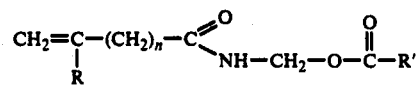

in which
R represents hydrogen or a methyl group,
n = 0 or an integer from 1 to 5, and R' represents a linear or branched aliphatic radical with from 1 to 10 carbon atoms.

Of the acyl esters of N-methylol compounds of unsaturated acid amides, (meth)acrylamide-N-methylol acetyl ester and (meth)acrylamide-N-methylol propionyl ester are particularly suitable. These compounds may readily be obtained by the methods described in the literature from N-methylol acrylamide and the corresponding carboxylic acid anhydride (E. Muller, K. Dinges, W. Graulich, Makro. Mol. Chem. 57, 27 (1962)) or from the methylol methyl ethers of (meth)acrylic acid amide and the corresponding carboxylic acid anhydride (German Offenlegungschrift No. 1,927,642). Quantities of from 0.4 to 1% by weight are preferably used.

The optionally copolymerizing (meth)acrylic acid amide-N-methylol alkyl ether used is preferably a compound corresponding to the general formula:

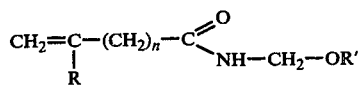

in which

R represents hydrogen or a methyl group, n = 0 or an integer from 1 to 5, and

R' represents a linear or branched aliphatic radical with from 1 to 10 carbon atoms.

Examples of alkyl ethers of N-methylol compounds of unsaturated acid amides, which are preferably used in quantities of from 0.5 to 5%, are (meth)acrylamide-N-methylol ethyl ether, (meth)acrylamide-N-methylol-n-propyl ether, (meth)acrylamide-N-methylol-i-propyl ether, but preferably (meth)acrylamide-N-methylol methyl ether. These compounds may readily be synthesized by the methods described in the literature (E. Muller, K. Dinges, W. Graulich, Makro. Mol. Chem. 57, 27 (1962)). The polymerisation reaction is carried out in an aqueous system.

The other comonomers optionally used are in particular the monomers commonly encountered in the production of acrylonitrile fibers. Preferred monomers of this type are acrylic acid and methacrylic acid alkyl esters such as, for example, (meth)acrylic acid methyl ester and (meth)acrylic acid ethyl ester. Monomers such as these are preferably copolymerized in quantities of up to 10% by weight. It is also possible to incorporate the usual dye-receptive additives such as, for example, unsaturated sulphonic acids, preferably methallyl sulphonic acid, vinyl sulphonic acid or styrene sulphonic acid and their alkali metal salts, in the copolymer in quantities of up to about 3% by weight. In cases where halogen-containing monomers are copolymerized to improve fire resistance, they are best used in quantities of from 10 to 30% by weight.

The initiators used are the known redox systems, preferably alkali metal peroxodisulphate/alkali metal bisulphite. The quantitative ratio between the two components of the initiator system generally amounts to between 4:1 and 1:4. Polymerization is best carried out at a pH-value in the range of from 2 to 4.2 and preferably at a pH-value in the range of from 2.5 to 3.9. The polymerization temperature should be in the range of from 30° to 70° C. and preferably in the range of from 50° to 60° C., whilst the polymerization time should amount to between 3 and 10 hours and preferably to between 5 and 7 hours. The polymers are isolated in the usual way by filtration under suction. They are then dried for 3 to 10 hours at a temperature of from 30° to 80° C.

The polymers obtained in accordance with the invention are stable in storage for indefinite periods. They may be processed into shaped articles by known methods without any particular precautionary measures. They are preferably dry-spun or wet-spun into crosslinkable filaments by known methods. In the polymers according to the invention, the heat required to initiate thermal crosslinking liberates small quantities of organic acid which in turn catalyses the rest of the crosslinking process. As a result, there is no need for mineral acid to be added and the crosslinking conditions can be controlled through the content of N-methylol acyl esters. Preferred spinning solvents are dimethyl formamide, dimethyl acetamide and dimethyl sulphoxide.

In the following Examples, parts by volume are to parts by weight as milliliters to grams.

EXAMPLE 1

673,000 parts by volume of acrylonitrile and 17,000 parts by weight of N-acetoxy methyl methacrylamide, together with 28,000 parts by weight of urea, are stirred under nitrogen at up to 55° C. in 7,000,000 parts by volume of water. After acidification to pH 3.5 with concentrated sulphuric acid, the polymerization reaction is initiated by the addition of 5000 parts by weight of potassium peroxodisulphate and 20,000 parts by weight of sodium bisulphite. After 5 hours, the polymer which has precipitated is filtered off under suction, washed and dried. Yield: 517,000 parts by weight, K-value: 80.

EXAMPLE 2

625,000 parts by volume of acrylonitrile, 28,800 parts by volume of acrylic acid methyl ester and 17,000 parts by weight of N-acetoxymethyl methacrylamide, together with 28,000 parts by weight of urea, are stirred under nitrogen at 55° C. in 7,000,000 parts by volume of water. After acidification, the polymerization reaction is initiated in the same way as described in Example 1. After 4.5 hours, the polymer is worked up in the same way as in Example 1. Yield: 504,000 parts by weight, K-value: 87.

EXAMPLE 3

80,000 parts by volume of acrylonitrile and 649 parts by weight of N-acetoxymethyl methacrylamide together with 6500 parts by weight of caprolactam are stirred into 900,000 parts by volume of water. The pH-value is adjusted to 3.5 by the addition of concentrated sulphuric acid under nitrogen at 55° C. Polymerization is initiated by the addition of 500 parts by weight of potassium peroxodisulphate and 2000 parts by weight of sodium bisulphite. The reaction is over after 5.5 hours. The polymer is worked up in the same way as described in Example 1. Yield: 69,000 parts by weight, K-value: 78.

EXAMPLE 4

80,000 parts by volume of acrylonitrile, 649 parts by weight of N-acetoxymethyl acrylamide and 6500 parts by weight of dimethyl acetamide and stirred under nitrogen at 55° C. in 900,000 parts by volume of water (pH-value 3.5). The initiation, working up and reaction time are as described in Example 3. Yield: 71,000 parts by weight, K-value: 83.

EXAMPLE 5

80,000 parts by volume of acrylonitrile, 649 parts by weight of N-acetoxymethyl methacrylamide and 2550 parts by weight of N-methoxymethyl acrylamide are stirred under nitrogen at 55° C. in 900,000 parts by volume of water (pH-value 3.5). The initiation, working up and reaction time are as described in Example 3. Yield: 53,000 parts by weight, K-value: 83.

What is claimed is:

1. In a process for the preparation of a stabilized copolymer of acrylonitrile by copolymerizing in an aqueous medium in the presence of a redox catalyst at a pH of 2 to 4.2 a mixture containing
    a. at least 65% by weight acrylonitrile
    b. 0.1 to 3% by weight of an N-methylol acylester of the formula

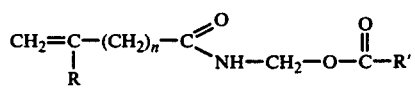

wherein
R is hydrogen or methyl;
R' is a linear or branched aliphatic radical of 1-10 carbon atoms; and
n is 0 or an integer from 1-5; and
    c. 0 or 0.5-5% by weight of an N-methylol alkylether of the formula

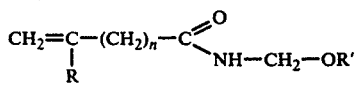

wherein
R, R', and n have the same meaning as given above;
the improvement which comprises carrying out the copolymerization in the presence of 2 to 12% by weight, based on the total quantity of comonomers, of at least one water-soluble compound of the following types:

1. a carboxylic acid amide of the formula

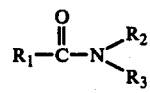

wherein
$R_1$ is hydrogen, $C_1$-$C_6$-alkyl, phenyl or

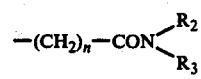

where n is 1-3; and
$R_2$ and $R_3$ are the same or different and are hydrogen or $C_1$-$C_6$-alkyl;

2. urea of the formula

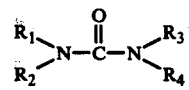

wherein
$R_1$, $R_2$, $R_3$, and $R_4$ are the same or different and are hydrogen or $C_1$-$C_3$-alkyl; and 3. a lactam of the formula

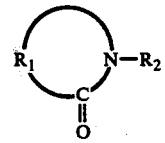

wherein
$R_1$ is $C_3$-$C_6$-alkylene and
$R_2$ is $C_1$-$C_3$-alkyl.

* * * * *